March 23, 1926.
H. WILLSHAW
1,577,886
METHOD AND APPARATUS FOR MANUFACTURE OF CUSHION TIRES
Filed May 28, 1924
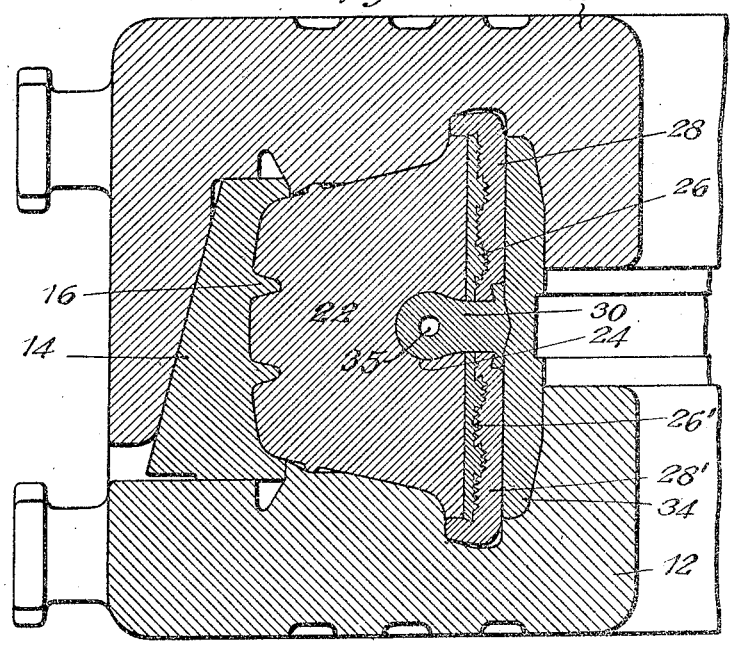
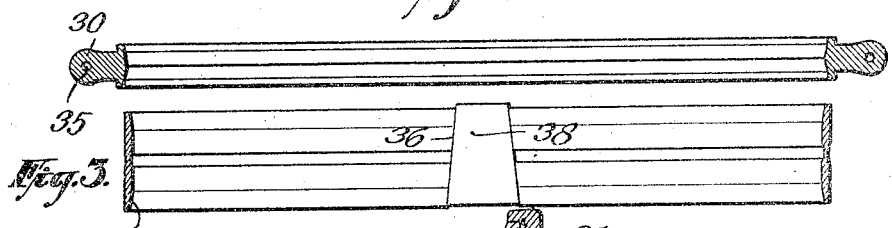
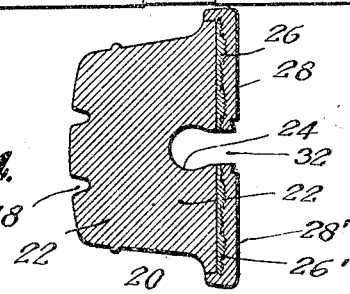
Inventor
HARRY WILLSHAW
By his Attorney Patented Mar. 23, 1926.

1,577,886

UNITED STATES PATENT OFFICE.

HARRY WILLSHAW, OF BUFFALO, NEW YORK, ASSIGNOR TO DUNLOP TIRE AND RUBBER CORPORATION OF AMERICA, OF BUFFALO, NEW YORK, A CORPORATION OF NEW YORK.

METHOD AND APPARATUS FOR MANUFACTURE OF CUSHION TIRES.

Application filed May 28, 1924. Serial No. 716,298.

*To all whom it may concern:*

Be it known that I, HARRY WILLSHAW, a subject of the King of Great Britain, and a resident of Buffalo, in the county of Erie and State of New York, have invented certain new and useful Improvements in Methods and Apparatus for Manufacture of Cushion Tires, of which the following is a specification.

This invention is in part a continuation and in part an improvement of the method disclosed in my co-pending application Serial No. 693,953 filed February 20, 1924.

The present invention relates particularly to a method of manufacturing cushion tires of the semi-solid type by the utilization of molds for shaping the tire to the desired contour and a resilient core which may be solid or semi-solid.

The invention will be understood from the following specification when read in connection with the accompanying drawings in which Fig. 1 illustrates a novel apparatus for carrying out my improved method;

Fig. 2 is a detail section of the resilient core which I employ in carrying out my method;

Fig. 3 is a detail of the core ring; and

Fig. 4 is a sectional view of a cushion tire made according to my invention.

Referring particularly to the drawings, 10 and 12 represent respectively upper and lower tire mold sections between which is located a segmental tread section 14 having suitable projections 16 thereon adapted to form indentations 18 in the tread portion of the tire 20. The body portion 22 of the tire is extruded through suitable dies which shapes it to the contour shown in the drawings and is formed with a substantially circular cavity 24. The body portion or raw rubber is placed on the vulcanite bands 26 and 26' which are molded or otherwise anchored to the metallic tire bands 28 and 28'. A core 30 is inserted through the circumferential slot 32 between the tire band sections 28 and 28'. A core ring 34 which is split transversely as at 36 is applied to the assembled core and tire and a wedge member 38 is inserted between the adjacent ends of the core rings so as to lock the same to the tire band. This assemblage is now placed in the lower mold 12 whereupon the segmental tread ring 14 and upper mold 10 are put in place. The uncured tire is now subjected to suitable heat treatment so as to thoroughly vulcanize the whole tire.

After vulcanization is completed, the mold sections 10 and 12 are separated and the segmental tread ring 14 is removed. The wedge 38 is next removed from the split core ring so as to permit removal of the core 30. A suitable hand tool is applied to slightly expand or separate the rim sections 28 and 28' so as to facilitate removal of the core 30. This core is preferably made of resilient material and in one continuous piece. It is usually made of solid rubber but may be in some cases provided with a small peripheral cavity 35. At any rate, the thickness and character of the material is such that the core holds its shape during the vulcanization of the cushion tire, yet it is sufficiently resilient so that when removing the same from the completed tire, the pulling of the core will slightly contract its sectional area so as to facilitate its easy removal.

The resilient core herein referred to has the advantage over iron cores or solid cores such as sand and the like heretofore used in that it is made in one continuous piece without joints which must be used in other types of cores to permit removal thereof from the tire. Jointed cores are objectionable as they leave sprue ribs on the inside of the tire where the sections come together. The rubber core has the additional advantage that it is lighter in weight hence can be handled more easily by workmen than metallic cores. The solid core has the advantage over the inflatable core in the above referred to co-pending application in that it does away with the necessity of the air and water connections and relieves the operator of the necessity of carefully applying the right pressure to inflatable cores during vulcanization. The core is unbreakable and can be used repeatedly and has the further advantage that it can be made by the manufacturer of tires whereas in the case of metallic cores and sand cores special equipment is required which is not ordinarily available to tire manufacturers.

The contractibility of the core above referred to is one of the important features of the invention and by virtue of this characteristic of the resilient core, the act of pulling the latter endwise reduces its cross-sectional area to such an extent that it is slightly separated from the inner surface of the vulcanized tire and hence can be easily withdrawn.

While I have described with great particularity, particular steps in the method of manufacturing a tire such as herein disclosed and the particular apparatus for carrying out this method, it is not to be construed that I am limited thereto as changes and modifications may be made by those skilled in the art without departure from the invention as defined in the appended claims.

What I claim is:—

1. In the manufacture of tires, the method which consists in assembling the tire on a rim comprising two parts with a space between them, inserting a semi-solid rubber core to retain the shape of the cavity in the tire during the subsequent steps, vulcanizing the tire with said core in place and stretching the core to alter its cross-sectional area to facilitate its removal from the tire.

2. An apparatus for use in connection with the manufacture of tires comprising a core which is of substantially circular shape lengthwise and which in cross-section is of the shape desired for the interior of the tire, and adapted when pulled lengthwise to contract in cross-section so as to free it from the surrounding tire.

3. In the manufacture of tires the method which consists in molding the same about a core of resilient material adapted when pulled lengthwise to contract in cross-section, and pulling said core endwise to cause such contraction and to separate it from the molded tire and remove it.

In witness whereof, I have hereunto signed my name.

HARRY WILLSHAW.